United States Patent [19]

Reed, Jr.

[11] 4,263,407

[45] Apr. 21, 1981

[54] POLYMERIC ADSORBENTS FROM MACRORETICULAR POLYMER BEADS

[75] Inventor: Samuel F. Reed, Jr., Holland, Pa.

[73] Assignee: Rohm and Haas Company, Philadelphia, Pa.

[21] Appl. No.: 129,772

[22] Filed: Mar. 12, 1980

Related U.S. Application Data

[63] Continuation of Ser. No. 927,221, Jul. 24, 1978, abandoned.

[51] Int. Cl.$^3$ ...................... B01J 1/22; C08F 212/36; C08J 3/24
[52] U.S. Cl. ........................................................ 521/33
[58] Field of Search .................................... 521/31, 33

[56] References Cited

U.S. PATENT DOCUMENTS

| | | | |
|---|---|---|---|
| 3,586,644 | 6/1971 | Jon de Jong | 521/32 |
| 4,191,813 | 3/1980 | Reed et al. | 521/33 |
| 4,192,920 | 3/1980 | Amick | 521/31 |
| 4,217,421 | 8/1980 | Beasley | 521/32 |

Primary Examiner—Joseph L. Schofer
Assistant Examiner—Peter F. Kulkosky
Attorney, Agent, or Firm—Patrick C. Baker

[57] ABSTRACT

Polymeric adsorbents exhibiting improved porosity and adsorption are produced from lightly crosslinked macroreticular aromatic copolymer beads by post-crosslinking the copolymer beads while in a swollen state, the crosslinks resulting from the post-crosslinking comprising the residue of an external crosslinker selected from a polyfunctional alkylating agent, a polyfunctional acylating agent, and a sulfur halide. An acid catalyst is used for the post-crosslinking, such as a Friedel-Crafts catalyst. The adsorbents may be functionalized to ion exchange resins.

25 Claims, No Drawings

POLYMERIC ADSORBENTS FROM MACRORETICULAR POLYMER BEADS

This is a continuation of application Ser. No. 927,221 filed July 24, 1978, the latter being abandoned as of the filing of this application.

BACKGROUND OF THE INVENTION

This invention relates to polymeric adsorbents and ion exchange resins of the macronet type, methods of preparing the adsorbents and resins, and uses of the adsorbents and resins for water-treatment, recovery of organic materials from gaseous and other streams, pharmaceutical purification and processing, catalysis, and similar applications.

Adsorbents are commonly solids which exhibit selectivity at their surface for substances in a mixture, thereby providing a means of separating such substances from the mixture. The high surface area characteristic of adsorbents (usually well above 5 m.$^2$/g. of solid) normally results from a fine state of subdivision (non-porous adsorbents) or from pores in the adsorbent particles (porous adsorbents). Carbon black and $TiO_2$ and $ZnO$ pigments are examples of non-porous adsorbents. Granular carbon, silica gel, bone char, certain soils and asbestos are examples of well-known porous adsorbents obtained from naturally occurring materials. For separation or purification of complex substances (such as pharmaceuticals) synthetic adsorbents have been developed, some of which serve also as ion exchange materials or as intermediates for the manufacture of ion exchange materials. However, ion exchange is an absorption as well as an adsorption phenomenon, so that although all ion exchange materials are adsorbents, the converse is not necessarily true.

The synthetic adsorbents generally are porous polymeric solids, polystyrene and styrene-divinylbenzene copolymers being representative. Although it is possible to prepare synthetic polymers in a fine state of subdivision, or to grind such polymers to a fine particle size, to obtain high surface area, fine particle size adsorbents cannot be used in cyclic processes, particularly processes involving columns, since the fine particles pack too tightly and impede flow. Adsorbents of moderately large particle size, of the order of about 0.02 mm. to 2 mm. diameter or greater, are therefore required. Polymeric beads, obtained by known suspension polymerization techniques, have a convenient particle size for use in columnar operations. Nevertheless, although the polymeric adsorbents can be made hydrophobic and the bead form enhances the usefulness of the polymeric adsorbents, their adsorbent properties have been too limited to enable the adsorbents to compete effectively with the carbonaceous adsorbents obtained from the pyrolysis of organic materials. However, the latter suffer from high moisture pickup in humid atmospheres, have poor reproducibility during manufacture, and have such fine pores and rigid structure as to crack, split and decrepitate under the high osmotic pressures commonly encountered in cyclic operations.

An object of the invention is to provide synthetic polymeric adsorbents and ion exchange resins which combine the best properties of known synthetic polymeric adsorbents and carbonaceous adsorbents but without the most serious deficiencies of either class. Accordingly, the adsorbents and ion exchange resins of the invention have moderate and uniform particle size (to permit use in columnar operations), are hydrophobic, have good physical stability (resistance to cracking and other forms of destruction under osmotic pressure), have high surface area and/or high porosity, and sometimes exhibit high adsorption capacity without exceptionally high surface area and/or porosity. In this regard, even though certain of the adsorbents lack the extremely high surface areas of known polymeric adsorbents or activated carbon adsorbents, they equal the performance, or even outperform, such adsorbents, especially in their adsorption capacity for organic liquids at high concentration.

SUMMARY OF THE INVENTION

The adsorbents of the invention are polymeric materials in macroreticular bead form and are produced by swelling a lightly crosslinked macroreticular aromatic polymer bead in an inert organic solvent, and then post-crosslinking by contacting the swollen polymer beads with an external crosslinker selected from polyfunctional alkylating or acylating agents and a sulfur halide. A Friedel-Crafts type acid catalyst is used for the post-crosslinking. Typically, the adsorbents have surface areas in the range of about 100–1400 m.$^2$/g. and porosities of at least 0.2 cc/cc, more usually 0.3–0.6.

The adsorbents are called "macronets" because the crosslinks are stable and have a long and rigid structure. Such structure results from post-crosslinking lightly crosslinked polymer substrates while in a highly swollen state, the swollen state causing displacement of the polymer chains at significant distances from each other. The use of macroreticular polymer substrates in accordance with the present invention greatly enhances the porosity and adsorbent properties of the products. The term "macronet" has been used to describe the ion exchange functionalized polystyrene and styrene-divinylbenzene copolymer macromolecules obtained by crosslinking linear polystyrene in solution or styrene polymers in the swollen state by reaction with an alkylating agent under Friedel-Crafts conditions, as described in U.S. Pat. No. 3,729,457 and in related articles in *The Journal of Polymer Science*, Symposium No. 47, pages 95–101 and 189–195 (1974). Similar ion exchange resin products are disclosed in British Pat. No. 1,095,746 wherein polystyrene or a styrene derivative in a swollen pearl form undergoes crosslinking by acylation under Friedel-Crafts conditions. In these reactions, although a macronet product is obtainable, the absence of a polymer bead form or macroreticular structure makes the products uneconomical or gives products of inferior performance as compared with the macroreticular macronet adsorbents and ion exchange resins of the present invention.

The term "macroreticular" as opposed to "microreticular" means porous adsorbents in which the pores are larger than atomic distances and are not part of the polymer structure per se. Rather, the pores are microscopic channels resulting from the squeezing out of an organic precipitant from a copolymer mass. As a consequence, the pore structure is not dependent upon environment and therefore is retained despite contact with various concentrations of electrolyte, solvent and exchangeable ions. In "microreticular" (gel-type) adsorbents the "pores" are not really pores at all because they are extremely small, usually below 30 Å in diameter, and will disappear from the polymer structure when the polymer is dried. Because the pores of macroreticular resins are relatively large and are not greatly influenced by changes in environmental conditions, the macroreticular polymers are able to withstand large osmotic pressure variations commonly encountered in cyclic processes. Moreover, their moderately large particle size makes them especially useful in operations utilizing columns particularly in their ion exchange form, where the molecular weight of an ionic species to be exchanged is so high as to exclude use of gel-type ion exchange resins. Macroreticular polymers for ion exchange resin use are described in the technical literature, as in U.S. Pat. Nos. 3,037,052, 3,637,535 and 3,843,566.

DETAILED DESCRIPTION

The lightly crosslinked macroreticular aromatic copolymer beads used as substrates in forming the macronet adsorbents and ion exchange resins of the invention are a well-known class of materials as exemplified in the U.S. patents listed immediately above and in other patents and publications, and many are commercially available. Accordingly, only a brief description of these materials is necessary.

In summary, the macroreticular substrate polymers are lightly crosslinked copolymers of (1) a polyunsaturated monomer, containing a plurality of non-conjugated $CH_2=C<$ groups, which acts as a crosslinking agent, and (2) a monoethylenically unsaturated monomer. At least one of the polyunsaturated and monoethylenically unsaturated monomers is aromatic, and preferably both are aromatic, provided that a major proportion of the copolymer (at least 50% by weight) is aromatic. For light crosslinking, sufficient of the polyunsaturated monomer will be used to give dimensional stability to the copolymer bead so that it will swell rather than dissolve in the subsequent swelling step. Suitable amounts of such monomers are from about 0.25 to about 20% by weight of the monomer mixture, preferably closer to the lower range, of the order of about 0.5 to 8%, and more usually about 1-4%. The preferred polyunsaturated monomers include divinylbenzene, trivinylbenzene and the like, and the preferred monoethylenically unsaturated monomers include styrene, the o, m, and p-methyl styrenes, and o, m, and p-ethyl styrenes, ethylvinylbenzene, vinylnaphthalene and vinyltoluene. While hydrocarbon monomers are preferred, the monomers may also include heterocyclic compounds such as divinylpyridine. Among the aliphatic polyunsaturated monomers may be mentioned diacrylates and dimethacrylates, such as ethylene glycol diacrylate, ethylene glycol dimethacrylate, trimethylolpropane trimethacrylate, neopentyl glycol dimethacrylate, divinylketone, divinyl sulfide, allyl acrylate, diallyl maleate, diallyl fumarate, and the like. Suitable monoethylenically unsaturated aliphatic monomers include esters of acrylic acid, such as methyl, ethyl and propyl acrylate, and the corresponding esters of methacrylic acid, wherein the ester group contains 1-10 carbon atoms. The preferred macronet adsorbents of the invention are based on macroreticular copolymers of styrene and divinylbenzene (about 99-2 wt. % styrene, balance divinylbenzene) and copolymers of styrene (about 40-60 wt. %), vinylbenzyl chloride (about 40-60 wt. %) and divinylbenzene (about 1-20 wt. %). The foregoing ranges are on the basis of 100% active monomers. When commercial grades of divinylbenzene are used, about 20-50% of the divinylbenzene is ethylvinylbenzene and it is conventional to include the ethylvinylbenzene with the styrene or other monovinyl monomer when specifying the proportion of styrene or other monovinyl monomer. The polymers may contain minor amounts of other monomers, such as about 1-4% by weight of acrylonitrile.

The macroreticular polymers are prepared most usually under suspension polymerization conditions utilizing a free radical catalyst and a liquid precipitant (phase extender) which acts as a solvent for the monomer mixture and which is present in such amount as to exert such small solvating action on the product crosslinked copolymer that phase separation of the product copolymer takes place. The precipitant is chemically inert under the polymerization conditions and its selection will be determined by the character of the monomers in the monomer mixture. When employing the preferred aromatic hydrocarbon monomers of the invention, such as styrene, divinylbenzene and ethylvinylbenzene, alone or with vinylbenzyl chloride, the precipitant may be an alkanol containing 4-10 carbon atoms, such as methylisobutylcarbinol, or it may be a saturated aliphatic hydrocarbon containing at least 7 carbon atoms, such as heptane, isooctane, and cyclohexane.

When suspension polymerization is the polymerization method used, the precipitant must be either immiscible or only partially miscible with the suspending medium.

Other monomer compositions from which the macroreticular copolymers may be formed are described in U.S. Pat. No. 3,991,017, and in U.S. Pat. Nos. 3,275,548 and 3,357,158 and British Pat. Nos. 932,125 and 932,126 (incorporated by reference into U.S. Pat. No. 3,991,017).

After formation of the macroreticular polymer (or coincident therewith if the precipitant is a swelling solvent), the polymer is swollen in an inert organic solvent. A variety of solvents and solvent mixtures may be used for this purpose, including chlorinated hydrocarbons such as chlorobenzene, ethylene dichloride, perchloroethylene, propylene dichloride, and dichlorobenzene; aliphatic hydrocarbons, such as hexane, isooctane and petroleum ether; nitro paraffins such as nitro propane; nitro aromatics such as nitro benzene; and miscellaneous solvents such as carbon disulfide. Ethylene dichloride is the preferred solvent.

While the copolymer is in the swollen state and is in the swelling solvent, a Friedel-Crafts catalyst and crosslinking agent are added and the mixture heated to about 40°-100° C. or higher (depending on the boiling point of the solvent) for about 1-24 hours to effect the postcrosslinking. Other reaction temperatures and times may be used, depending upon the reactive species and catalyst in the reaction mixture. Following reaction, the reaction mixture is quenched with water or a lower alkanol such as methanol, or acetone, or by inverse aqueous quenching, and the macronet polymer beads separated by thorough washing with suitable solvents and drying.

Polyfunctional alkylating agents give the best products but useful macronet adsorbents are also prepared with polyfunctional acylating agents and with inorganic sulfur halides. The polyfunctional alkylating agents include polyhalides, polyols and polyolefins, such as α,α-dichloro-p-xylene, polyvinyl chloride, methylene chloride, chloromethyl methyl ether, bis(chloromethyl)benzene, bis 1,4-chloromethyl biphenyl, bis(chloromethyl)thiophene, 1,4-dichlorohexane, 1,4-dichlorobutane, chloroform, carbon tetrachloride, paraldehyde, alkylene glycols such as ethylene glycol, diepoxides, polybutadienes, and the like. It will be apparent that the alkylating agents may contain aromatic groups provided the atoms of the alkylating agents which bond to the macroreticular polymer are aliphatic carbon atoms.

The difunctional acylating agents preferably are aromatic compounds but also include aliphatic compounds. Generally, the acylating agents are diacid chlorides although polyesters and polyamides are also useful. In the case of the aromatic diacid chlorides, the carbonyl groups must be separated by at least one carbon atom. For example, while suitable aromatic diacid chlorides include terephthaloyl chloride and isophthaloyl chloride, ortho-phthaloyl chloride would not be suitable since it tends to form anthraquinone rings which in turn participate in redox reactions.

Other suitable acylating agents include 1,4-naphthoyl dichloride, 1,5-naphthoyl dichloride, 1,6-naphthoyl dichloride, anthracene-1,5-diacid chloride, anthracene-1,9-diacid chloride, chlorofumaric acid, dichloromaleic acid, and the dichlorides of malonic, succinic, adipic and sebacic acids. Still other acylating agents include phosgene and thiophosgene. The inorganic sulfur halide crosslinkers are liquids under the reaction conditions and include sulfur monochloride, sulfur dichloride and the corresponding bromides.

Any Friedel-Crafts type catalyst may be utilized to catalyze the reaction, such as the acidic metal halides, including aluminum chloride, stannic chloride (preferred), aluminum bromide, boron fluoride, zinc chloride, ferric chloride, and the like. The swelling solvent and the solvent selected for the reaction medium, if an additional solvent is used, may be the same or different but should be solvents which will not deactivate the Friedel-Crafts catalyst. The swelling solvents set forth above have this character. From about 0.001% to about 5% by weight of catalyst based on polymeric substrate will be effective, but the optimum amount of catalyst will depend upon the reactants and conditions of the reaction.

The crosslinking agent added to the reaction mixture effects "external" (sometimes called "secondary") crosslinking, as contrasted with crosslinking which may occur internally between monomers in the polymer backbone which will crosslink in the presence of a Friedel-Crafts catalyst. One such monomer is vinylbenzyl chloride. A combination of external and internal croslining is also a feature of the invention, as illustrated hereinafter.

If desired, the macronet adsorbents may be converted to ion exchange resins by known techniques. For example, the adsorbents may be converted to weak base resins by chloromethylation (if not based on vinylbenzyl chloride) and then aminolysis with dimethylamine, or to strong base resins by chloromethylation (if required) and then amination with trialkyl amines such as trimethylamine. Likewise, certain of the adsorbents may be converted to acidic cation exchange resins by sulfonation or phosphorylation. It will be understood that the more highly crosslinked the macronets the less useful are they as intermediates for ion exchange resin formation. However, if the crosslinking agents are aromatic or otherwise provide bulky crosslinks, the macronets products may still exhibit good ion exchange capacity upon functionalization to ion exchange form, even though highly crosslinked. Accordingly, a balance is required between crosslinking density and crosslink bulk for use of the macronets in ion exchange resin formation. Functionalizing of polymeric adsorbents to form ion exchange resins is well-known and therefore requires no further elaboration. The patents listed above provide good description of ion exchange resin formation.

The macronet adsorbents may also be used as substrates for the formation of hybrid copolymers and ion exchange resins in accordance with U.S. Pat. No. 3,991,017. Briefly, in forming hybrid copolymers and ion exchange resins, a liquid monomer mixture containing a crosslinking monomer is added to an aqueous suspension of the macronet adsorbent, which liquid monomer mixture is imbibed into the pores of the macronet adsorbent and is polymerized therein. The resulting hybrid product may then be converted to an ion exchange resin by appropriate functionalization in the conventional manner. If the macronet adsorbent and/or the imbibed monomer mixture contains a carboxylic acid containing monomer, the resulting hybrid product may be converted to an amphoteric ion exchange resin by aminolysis and hydrolysis.

It is thus evident that a wide variety of adsorbents and ion exchange resins may be produced in accordance with the invention. By selection of monomers, swelling solvents, crosslinking agents and Friedel-Crafts alkylating or acylating agents, polymers can be obtained with high surface area, high porosity, large pore size, good pore distribution, excellent physical stability and large particle size. These properties make the product suitable for liquid and gas phase separations and various other adsorbent and ion exchange applications. These include absorption of organic materials such as phenol, carbon tetrachloride, hexane, cumene, and methyl chloroform.

While the reasons for the exceptional adsorption capacities of the macronet polymer beads of the invention are not fully understood, it has been observed that the best adsorbents are prepared from copolymers which exhibit the highest swelling ratios in a given solvent. For example, those copolymer beads which swell to 6-10 times their dry volume in ethylene dichloride have adsorption capacities far exceeding those of conventional polymeric or carbon adsorbents with the same surface areas. A typical example is polymer beads prepared from styrene/divinylbenzene/acrylonitrile copolymer, monomer ratio 96/1.0/2.0, which is phase extended to macroreticular form with 28% by volume (of the organic phase) of methyl isobutyl carbinol. When swollen in ethylene dichloride and reacted under Friedel-Crafts conditions with polyvinylchloride, the macronet product beads have a surface area of 191 m.$^2$/g. but have adsorption capacity equal to that of a non-macronet polymer of similar composition having a surface area of 750 m.$^2$/g. The highly swollen condition which is then made permanent by the post-crosslinking reaction, in combination with the already high porosity and/or large pores of the macroreticular substrate, provides the exceptional adsorptive behavior characteristic of the products of the invention.

The following examples further illustrate the invention. Throughout this specification and claims unless otherwise indicated, all parts and percentages are by weight, and the divinylbenzene is commercial quality, about 50% active, balance essentially all ethylvinylbenzene. The abbreviations have the following meanings:

DVB—divinylbenzene
S—styrene
PS—polystyrene

VBC—vinylbenzyl chloride
AN—acrylonitrile
EDC—ethylene dichloride
MIBC—methylisobutyl carbinol
PVC—polyvinylchloride
CME—chloromethyl methyl ether
SA—surface area
XDC—α,α-dichloro-p-xylene
TPC—terephthaloyl chloride
MDC—methylene dichloride
NB—nitrobenzene
MR—macroreticular
DPE—diphenyl ether

EXAMPLE 1

A. Preparation of Macroreticular Copolymer Beads

To a 5 liter, 4-necked flask fitted with mechanical stirrer, reflux condenser, thermometer, nitrogen inlet, heating mantel, and thermowatch assembly was charged a premixed aqueous phase consisting of 1800 g. deionized water, 20 g. boric acid, 0.87 g. sodium nitrite, 114 g. poly(diallyl dimethyl ammonium chloride) dispersant, and 12.6 g. Pharmagel (trademark) gelatine protective colloid. The stirring rate was preset at 125 rpm and a slow nitrogen flow (blanket) started. With agitator off, a premixed organic phase consisting of 500 g. vinylbenzyl chloride, 450 g. styrene, 315 g. methylisobutyl carbinol (MIBC), 17.5 g. of 54% divinylbenzene, 18.9 g. acrylonitrile, 9.45 g. benzoyl peroxide, and 0.653 g. terpinoline was added. Agitation was started, the dispersion set by three on-off cycles, and the mixture heated to 72° C. for a period of 20 hours. The mixture was further heated to 100° C. to remove MIBC through azeotropic distillation while maintaining a fluid dispersion by the addition of deionized water (500 ml.). On cooling, the suspension copolymer beads were washed thoroughly with deionized water and oven dried at 80° C. for 24 hours.

B. Preparation of Macronet Beads

To a 1 liter, 3-necked flask fitted with mechanical stirrer, reflux condenser connected to a water scrubber, thermometer, and heating mantel was charged 31.2 g. of the macroreticular copolymer beads of Part A, 26.25 g. α,α-dichloro-p-xylene, and 300 ml. of ethylene dichloride. After standing about two days, the beads swelled to more than twice their initial volume. Then 54.0 g. stannic chloride in 50 ml. of ethylene dichloride was added and the mixture heated to reflux for a period of 7½ hours. On cooling, the reaction was quenched by dropwise addition of 300 ml. acetone with external cooling in a tap water bath. The solvents were removed by stick filtration, and the resin washed three times such with acetone, water, 10% HCl, water, and acetone. The product beads were then air dried followed by oven drying at 80° C. for 16 hours (yield=45.0 g.). Analysis: 3.99% Cl, surface area=1350 m$^2$/g., porosity=0.3638 cc/cc.

EXAMPLE 2

Essentially as described in Example 1, 31.2 g. of commercially available macroreticular copolymer beads (S/DVB, 97/3) and 26.25 g. α,α-dichloro-p-xylene swollen (20 hours) in 250 ml. ethylene dichloride was treated with 54.0 g. stannic chloride in 50 ml. of ethylene dichloride and heated to reflux for 8½ hours. Following quench, wash and isolation 46.1 g. of oven dried beads were obtained. Analysis: 1.66% Cl, surface area=445 m.$^2$/g, porosity=0.3456 cc/cc.

EXAMPLE 3

Essentially as described in Example 1, to 25 g. of macroreticular copolymer beads (S/DVB/AN, 96/2.0/2.0, phase extended with 28 vol. % MIBC) was added a solution of 14 g. commercial PVC in 250 ml. EDC. The mixture was heated for 16 hours, the swollen beads cooled, treated with 31.3 g. of anhydrous AlCl$_3$, heated after 2 hours at 25° C. to reflux and maintained at 83° C. for 5 hours. The reaction was quenched as in Example 1, producing a product with a surface area of 191 m$^2$/g.

EXAMPLE 4

Essentially as described in Example 1, 106 g. of macroreticular resin beads (S/DVB/AN, 96/2.0/2.0, phase extended with 51.3 vol. % toluene) was swelled over about 12 hours in a 2 liter, 3-necked flask with 1030 ml. of EDC. The flask was mounted in a toxic materials hood and equipped with a condenser, Teflon blade stirrer, N$_2$ inlet, two Claisen heads, two addition funnels and caustic CME scrubbers. CME (106 g., 1.32 mole) was added and the mixture was stirred for 45 min. at ambient temperature (ca. 20° C.). The mixture was then cooled to 0° C. After an additional 50 min. at 0° C., 116 ml. (1 mole) of SnCl$_4$ was added over a 20 min. period, whereupon the mixture slowly turned black. The mixture was warmed to 25° C. and stirred for 3 hours. It was then heated to reflux (85° C.) and maintained at that temperature for 5 hours, then cooled and stirred overnight. The mixture was chilled to 0° C. and 500 ml. of MeOH was added slowly at 0° C. over 2.5 hrs. to quench the reaction. The resin was stick filtered and treated successively with 500 ml. MeOH, and 500 ml. of 1 N NaOH (cloudy supernatant), stick filtered and washed with water (resin pH=11). Standard CME cleanup procedures (caustic wash) were used on filtrate solutions. The resin was backwashed in a graduate cylinder, then washed on a Buchner funnel with 1 N HCl, deionized water (twice), 1:1 MeOH/water, and MeOH. After air and vacuum drying (50° C.) the yield was 140.4 g. (112% of theoretical). Microscopic examination showed clear dark amber, mainly whole beads, SA=733 m$^2$/g.

EXAMPLES 5–28

Table I below summarizes the compositions, reaction conditions and product characteristics of Examples 1–4 as well as other preparations prepared substantially as described in Examples 1–4 with the changes indicated. In all of the examples the extent of crosslinking of the MR starting materials corresponds to the amount of crosslinking monomer. Thus, in Example 1, the MR composition is crosslinked to the extent of about 1.0% since the DVB is about 50% active, i.e., 1.0% of the composition. The analyses indicate the extraordinary adsorbency of the products since surface areas and porosities greatly exceed the 5 m.$^2$/g. and 0.2 requirements for usefulness, respectively.

TABLE I

| Ex. | MR Composition (%) | MR Amount (g) | Swelling Solvent (ml.) | Cross-linker (g) | Catalyst (g) | Reaction Conditions Temp. (°C.) | Time (Hrs.) | ANALYSIS % Cl | % S | SA (m.²/g.) | Porosity cc/cc (Dry) |
|---|---|---|---|---|---|---|---|---|---|---|---|
| 1 | S/VBC/DVB(54%)/AN 45.6/50.7/1.8/1.9 | 31.2 | EDC(300) | XDC (26.25) | SnCl₄ (54.0) | 83 | 7.5 | 3.99 | — | 1349.9 | 0.3638 |
| 2 | S/DVB, 97/3 | 31.2 | EDC(300) | XDC (26.25) | SnCl₄ (54.0) | 83 | 8.5 | 1.66 | — | 445.2 | 0.3456 |
| 3 | S/DVB/AN, 96/2.0/2.0 | | EDC | PVC | AlCl₃ | 83 | 5.0 | | | 191 | |
| 4 | (S/DVB/AN)¹ 96/2.0/2.0 | | EDC | CME | SnCl₄ | 85 | 5.0 | | | 733.5 | |
| 5 | S/DVB, 96/4 | 10.4 | EDC(75) | XDC (17.5) | SnCl₄ (34.0) | 83 | 4.5 | 1.9 | — | 404.5 | 0.75 |
| 6 | S/DVB, 96/4 | 31.2 | EDC(300) | XDC (52.5) | SnCl₄ (54.0) | 83 | 7.0 | 2.1 | — | 424.8 | 0.5086 |
| 7 | S/DVB, 96/4 | 31.2 | EDC(300) | XDC (52.5) | SnCl₄ (30.0) | 83 | 7.5 | 1.95 | — | 367.8 | 0.6187 |
| 8 | S/DVB, 96/4 | 31.2 | EDC(300) | XDC (52.5) | SnCl₄ (15.0) | 83 | 7.5 | 2.1 | — | 262.5 | 0.5677 |
| 9 | S/DVB, 96/4 | 31.2 | EDC(300) | XDC (52.5) | SnCl₄ (8.0) | 83 | 7.5 | 1.2 | — | 143.4 | 0.5705 |
| 10 | S/DVB, 96/4 | 31.2 | EDC(300) | XDC (52.5) | SnCl₄ (8.0) | 83 | 24.0 | 2.5 | — | 262.1 | 0.5738 |
| 11 | S/DVB, 96/4 | 31.2 | EDC(300) | TPC (60.9) | SnCl₄ (78.15) | 83 | 7.5 | 0.5 | — | 44.6 | 0.5262 |
| 11a | S/DVB, 96/4 | 31.2 | EDC(200) | XDC (52.5) | SnCl₄ (15.0) | 83 | 7.5 | 2.2 | — | 394.2 | 0.4939 |
| 12 | S/DVB, 96/4 | 31.2 | EDC(300) | XDC (26.25) | SnCl₄ (15.0) | 83 | 7.5 | 1.8 | — | 160.8 | 0.6174 |
| 13 | S/DVB, 96/4 | 31.2 | NB (300) | XDC (26.25) | AlCl₃ (40.0) | 90 | 7.5 | 0.72 | — | 150.9 | 0.5436 |
| 14 | S/DVB, 96/4 | 31.2 | EDC(200) NB (100) | TPC (30.45) | AlCl₃ (40.0) | 90 | 7.5 | 0.52 | — | 137.2 | 0.5324 |
| 15 | S/DVB, 97/3 | 31.2 | EDC(300) | XDC (52.5) | SnCl₄ (54.0) | 83 | 6.5 | | — | 441.7 | 0.3014 |
| 16 | S/DVB, 97/3 | 31.2 | NB (300) | TPC (30.45) | AlCl₃ (40.0) | 90 | 8.5 | 1.10 | — | 133.2 | 0.2518 |
| 17 | S/DVB, 97/3 | 31.2 | EDC(300) | S₂Cl₂ (20.25) | SnCl₄ (54.0) | 65–75 | 5.0 | 3.03 | 21.51 | 79.2 | 0.3294 |
| 18 | S/DVB, 97/3 | 31.2 | EDC(200) NB (100) | S₂Cl₂ (20.25) | AlCl₃ (40.0) | 78 | 7.0 | 2.59 | 19.72 | 134.1 | 0.4615 |
| 19 | S/DVB, 97/3 | 31.2 | EDC(200) NB (150) | TPC (30.45) | FeCl₃ (50.0) | 85–90 | 7.5 | 0.64 | — | 78.4 | 0.3581 |
| 20 | S/DVB, 97/3 | 31.2 | NB (300) | SCl₂ (15.45) | AlCl₃ (40.0) | 20 4 | RT 85–90 | 3.78 | 8.69 | 53.5 | 0.4090 |
| 21 | S/DVB, 97/3 | 31.2 | EDC(200) NB (100) | SCl₂ (15.45) | AlCl₃ (40.0) | 20 4 | RT 85–90 | 4.29 | 12.63 | 83.2 | 0.4572 |
| 22 | S/DVB, 97/3 | 31.2 | NB (200) | MDC (100 ml) | AlCl₃ (40.0) | 40–50 | 7.5 | 0.06 | — | 84.0 | 0.3153 |
| 23 | Same as Ex. 1 | 31.2 | EDC(300) NB (100) | S₂Cl₂ (20.25) | AlCl₃ (40.0) | 85 | 7.5 | 4.92 | 12.63 | 134.1 | 0.4615 |
| 24 | Same as Ex. 1 | 31.2 | EDC(400) | SCL₂ (15.45) | SnCl₄ (54.0) | RT 85 | 20 4 | 8.76 | 12.26 | 98.1 | 0.0827 |
| 25 | Same as Ex. 1 | 31.2 | NB (300) | MDC (100 ml) | AlCl₃ (40.0) | 40–50 | 7.5 | 0.95 | — | 445.1 | 0.2767 |
| 26 | Same as Ex. 1 | 31.2 | EDC(300) | XDC (26.25) | SnCl₄ (54.0) | 83 | 7.5 | 13.97 | — | 950.7 | 0.4124 |
| 26a | Same as Ex. 1 | 31.2 | EDC(300) | XDC (26.25) | SnCl₄ (54.0) | 83 | 7.5 | — | — | 920.5 | 0.4083 |
| 27 | VBC/DVB (54%) 90/10 | 50 | NB (200) | CHCl₃ (200 mil.) | AlCl₃ (133) | 90 | 8.0 | — | — | 358 | |
| 30 | (VT/DVB/AN)² 95/2.4/2.6 | 50 | EDC(900) | XDC (38.5) | SnCl₄ (114.7) | 82 | 5.0 | | | 15.6 | |
| 31 | (VBC/DVB/AN)³ 97/1/2 | 50 | EDC(800) | DPE (13.3) | SnCl₄ (86) | 82 | 5.0 | | | 300.7 | |
| 32 | (S/DVB/AN)⁴ 96.3/1.8/1.9 | 50 | EDC(800) | CCl₄ (73.7) | AlCl₃ (64.02) | Reflux | 4.0 | | | 72.6 | |

[1] Phase extended with toluene (53.4%)
[2] Phase extended with toluene (200 parts)
[3] Phase extended with MIBC (498 parts)
[4] Phase extended with MIBC (111.9 parts)

PERFORMANCE EVALUATIONS

The macronets of the invention (Table I above) were evaluated for adsorption of phenol, carbon tetrachloride/hexane, cumene, and methylchloroform. Table II reports columnar loading studies using solutions containing 6300 ppm. phenol as compared with a commercially available macroreticular S/DVB adsorbent not of the macronet type of the invention. It will be noted that the product of Example 1 exhibited 19% improvement in capacity over the commercial adsorbent.

TABLE II

| Adsorbent | Phenol Adsorption | | |
|---|---|---|---|
| | Capacity (g./l.) | Capacity Change (g./l.) | % Change |
| Commercial S/DVB | 80 | — | — |
| Ex. 1 | 95 | +15 | +19 |

Certain of the macronet beads of the invention (Table I above) were also evaluated for $CCl_4$ and hexane vapor phase adsorption by determining weight gain of the resin samples subjected to an environment of an excess of either adsorbate in hexadecane in a closed container for 24 hours. Table III reports the results as wt.% $CCl_4$ or hexane adsorbed as compared with three brands of activated carbon and three types of commercially available S/DVB adsorbent resins not of the macronet type. It will be noted that certain of the adsorbents of the invention were better than the carbon adsorbents.

TABLE III

| Adsorbent | $CCl_4$/Hexane Adsorption | |
|---|---|---|
| | Wt. % $CCl_4$ | Wt. % Hexane |
| BPC Activated Carbon | 60–65 | 25 |
| Witco 517 Activated Carbon | 60 | 28 |
| PCB Activated Carbon | 60 | — |
| Commercial S/DVB | 56 | 28.1 |
| Example 1 | 97 | 42 |
| Example 26 | 91 | 42 |
| Example 2 | 51 | 24 |
| Example 11a | 52 | 24 |
| Example 31 | 68.8 | 25.6 |
| Example 4 | 79.8 | 38.0 |

Table IV reports column loading for cumene and methylchloroform in the vapor phase as compared with a commercially available S/DVB non-macronet type adsorbent. It will be noted that the Example 4 sample adsorbed cumene more than 90%. In the methylchloroform loading studies, the Example 2 sample gave 84% pickup and the Examle 26 sample gave 94% pickup. In the same studies it will be noted that adsorption from a high concentration adsorbate ($C_o$=369,500 ppm.) was also excellent.

TABLE IV

| Adsorbent Example | CUMENE/METHYLCHLOROFORM (MCF) ADSORPTION | | | | | | | |
|---|---|---|---|---|---|---|---|---|
| | Sample Wt. (g) | | $C_c$ (ppm.)[1] | | Ceq. (ppm.)[2] | | Capacity (mg./g.) | |
| | MCF | Cumene | MCF | Cumene | MCF | Cumene | MCF | Cumene |
| 26 | 0.5017 | | 23,100 | | 112 | | 65 | |
| 2 | 0.4639 | | 23,100 | | 3847 | | 59 | |
| 26a | 0.5018 | | 23,100 | | 700 | | 63 | |
| Commercial S/DVB(control) | — | | 23,100 | | 110 | | 30 | |
| 26a | 3.0013 | | 369,500 | | 2880 | | 174 | |
| 4 | 3.0016 | | 369,500 | | 2880 | | 170 | |
| Commercial S/DVB(control) | — | | 369,500 | | 2000 | | 100 | |
| 26a | | 3.0006 | | 703,870 | | 570 | | 300 |
| 32 | | 3.0024 | | 703,870 | | 460 | | 300 |
| 3 | | 3.0028 | | 703,870 | | 1160 | | 300 |
| 4 | | 5.0017 | | 1,353,600 | | 1168 | | 350 |
| Commercial S/DVB(control) | | — | | 703,870 | | 1160 | | 380 |

[1] Initial concentration of adsorbate.
[2] Concentration of adsorbate at equilibrium after treatment with adsorbent.

I claim:

1. A polymeric adsorbent of the macronet type, comprising lightly crosslinked macroreticular aromatic copolymer beads post-crosslinked in a swollen state in the present of a Friedel-Crafts catalyst with a crosslinker selected from a polyfunctional alkylating or acylating agent and a sulfur halide.
2. The adsorbent of claim 1 wherein the aromatic copolymer is a copolymer of styrene and divinylbenzene.
3. The adsorbent of claim 1 wherein the aromatic copolymer is a copolymer of styrene and vinylbenzyl chloride.
4. The adsorbent of claim 1 wherein the aromatic copolymer is a copolymer of styrene, divinylbenzene and vinylbenzyl chloride.
5. The adsorbent of claim 1 wherein the aromatic copolymer is a copolymer of styrene, divinylbenzene, vinylbenzyl chloride and acrylonitrile.
6. The adsorbent of claim 1 wherein the crosslinker is a polyfunctional alkylating agent wherein the functionality comprises halogen, hydroxyl, olefin or epoxy, or any combination thereof.
7. The adsorbent of claim 1 wherein the crosslinker is a sulfur halide.
8. The adsorbent of claim 7 wherein the sulfur is sulfur monochloride or sulfur dichloride.
9. The adsorbent of claim 1 wherein the macroreticular aromatic copolymer beads are about 0.25–20% by weight crosslinked prior to said post-crosslinking.
10. The adsorbent of claim 1 wherein said aromatic copolymer is a copolymer of styrene, divinylbenzene and vinylbenzyl chloride, and said crosslinker is α,α-dichloro-p-xylene.
11. The adsorbent of claim 1 wherein said aromatic copolymer is a copolymer of styrene, divinylbenzene, vinylbenzyl chloride and acrylonitrile and said crosslinker is α,α-dichloro-p-xylene.
12. The adsorbent of claim 1 wherein said aromatic copolymer is a copolymer of styrene and divinylbenzene, and said crosslinker is α,α-dichloro-p-xylene.
13. The adsorbent of claim 1 wherein the crosslinker is an acylating agent.
14. The adsorbent of claim 13 wherein the crosslinker is terephthaloyl chloride.
15. A method of producing a polymeric adsorbent of the macronet type which comprises swelling lightly crosslinked macroreticular aromatic copolymer beads in an inert organic solvent and crosslinking the swollen beads in the presence of a Friedel-Crafts catalyst with a crosslinker selected from a polyfunctional alkylating or acylating agent and a sulfur halide.

16. The method of claim 15 wherein the aromatic copolymer is selected from a copolymer of styrene and divinylbenzene, a copolymer of styrene and vinylbenzyl chloride, a copolymer of styrene, divinylbenzene and vinylbenzyl chloride, and a copolymer of styrene, divinylbenzene, vinylbenzyl chloride and acrylonitrile.

17. The method of claim 15 wherein the crosslinker is a polyfunctional alkylating agent wherein the functionality comprises halogen, hydroxyl, olefin or epoxy, or any combination thereof.

18. The method of claim 15 wherein the crosslinker is a sulfur halide is sulfur monochloride or sulfur dichloride.

19. The method of claim 15 wherein said crosslinker is $\alpha,\alpha$-dichloro-p-xylene.

20. The method of claim 15 wherein the crosslinker is an acylating agent.

21. The method of claim 20 wherein the crosslinker is terephthaloyl chloride.

22. An ion exchange resin comprising a functionalized adsorbent of claim 1.

23. An ion exchange resin comprising a functionalized adsorbent of claim 2.

24. An ion exchange resin comprising a functionalized adsorbent of claim 3.

25. An ion exchange resin comprising a functionalized adsorbent of claim 4.

* * * * *

UNITED STATES PATENT AND TRADEMARK OFFICE
CERTIFICATE OF CORRECTION

PATENT NO. : 4,263,407
DATED : April 21, 1981
INVENTOR(S) : Samuel F. Reed, Jr.

It is certified that error appears in the above—identified patent and that said Letters Patent is hereby corrected as shown below:

Table I, Columns 9 and 10 - Example 28 of Table I left out - should read:

28  S/DVB  38.53  EDC(300)  $CHC_1$  $AlCl_3$  83  8.0  --  68
    97/3                    (110)    (67)

Table IV, bottom of column 11 - Each of three figures on last line should be moved under designations "Cumene".

Claim 1, line 4 - word "present" should read -- presence --.

Signed and Sealed this

Sixth Day of September 1983

[SEAL]

Attest:

GERALD J. MOSSINGHOFF

Attesting Officer

Commissioner of Patents and Trademarks